Patented Sept. 2, 1924.

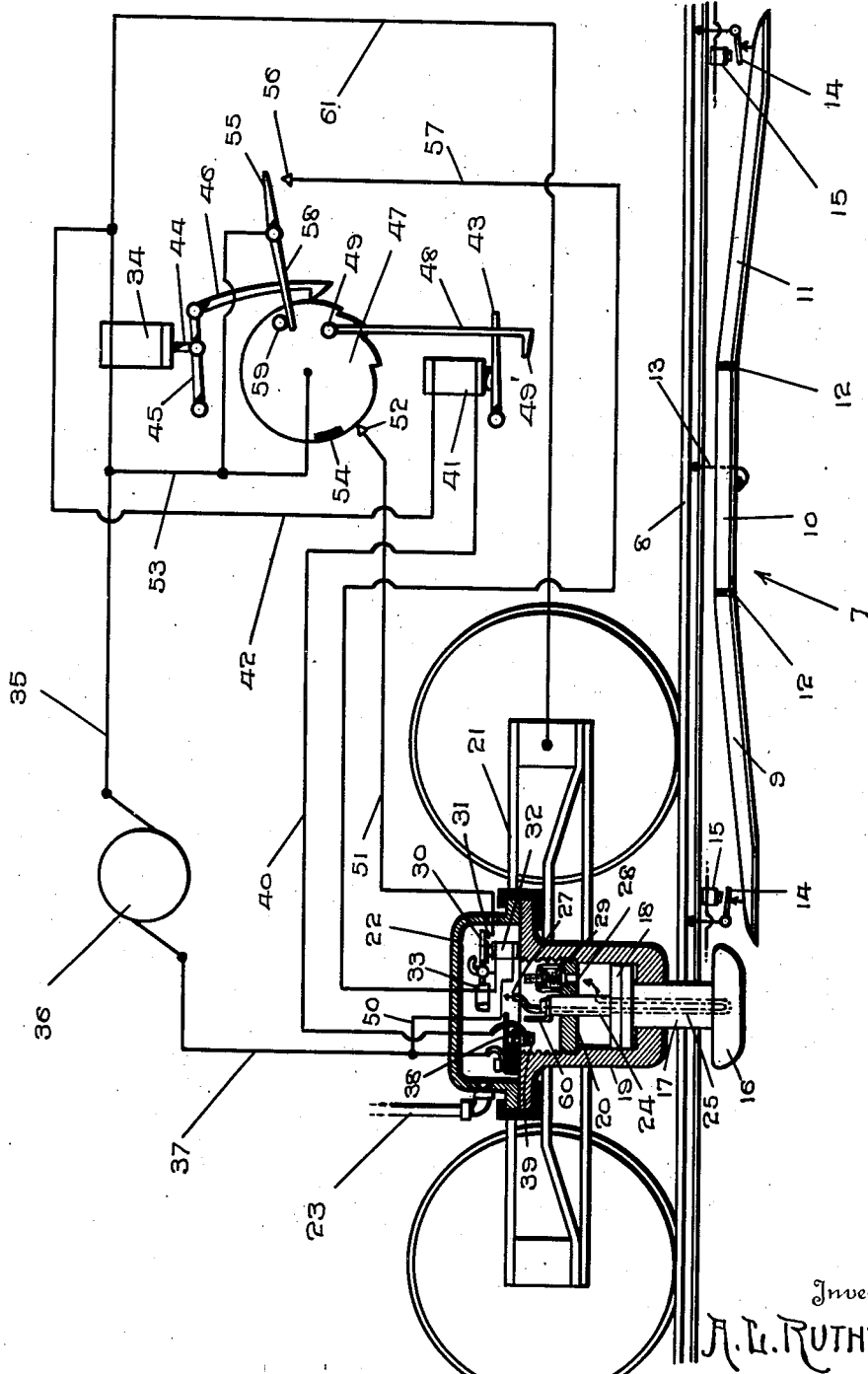

1,507,432

UNITED STATES PATENT OFFICE.

ALFRED L. RUTHVEN, OF ROCHESTER, NEW YORK.

SIMPLEX TRAIN CONTROL.

Application filed June 26, 1922. Serial No. 571,063.

*To all whom it may concern:*

Be it known that I, ALFRED L. RUTHVEN, a citizen of United States, residing at Rochester, in the county of Monroe and State of New York, have invented certain new and useful Improvements in Simplex Train Controls, of which the following is a specification, reference being had therein to the accompanying drawing.

The present invention relates to train controlling apparatus, and aims to provide a novel and improved intermittent contact type of control using a ramp for controlling a vehicle circuit and breaking and closing said circuit for obtaining the controlling conditions in the vehicle equipment.

Another object is the provision of a ramp over which a vehicle carried shoe is movable, for the control of the vehicle circuit, and bridging means between the ramp and track for the control of said circuit, with the source of energy for the circuit on the vehicle, and said circuit not requiring a source of energy for the track.

A further object is the provision of an intermittent electrical contact type of apparatus wherein the insulated joints are provided in the ramps and not in the rails of the track for controlling the vehicle circuit.

A still further object is the provision of novel means for mounting and operating the contact shoe.

Another object is the provision of novel means for maintaining a predetermined condition through a block, between controlling stations, such as a caution condition or retarded speed, and for removing or eliminating such condition when leaving the block and entering the next block.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein the figure is a diagrammatical view of the improved apparatus.

A ramp 7 is provided at each controlling station or point of the track at one side of a rail 8 of the track, and said ramp is composed of the inclined end section 9, the intermediate section 10, and the opposite inclined end section 11, with insulated joints 12 between said sections. The intermediate ramp section 10 is permanently in electrical connection with the rail 8 by the bridge or jumper 13, and switches 14 are provided for bridging the end sections 9 and 11 and rail 8, said switches when closed establishing bridges between the rail 8 and the corresponding end ramp sections, and magnets 15 being provided for controlling said switches. The switches close automatically when the magnets are deenergized, so that all of the sections of the ramp are thereby in electrical connection with the rail 8. The control of the vehicle equipment is obtained by the opening and closing of the switches 14, without requiring a source of current on the road bed or wayside, and the magnets 15 can be suitably connected in the signal circuits.

The contact shoe 16 which rides over the ramp in passing a controlling station is carried by the lower end of a stem 17 depending from a piston 18 working in a cylinder 19. A partition or disk 20 is secured in the cylinder above the piston, for defining the chamber in which the piston moves. The cylinder 19 is secured to a truck 21 of the locomotive or other vehicle, and is insulated therefrom, and a cap or housing 22 is secured on the upper end of the cylinder to enclose the working parts underneath. A pipe 23 is connected to the housing 22 and leads from the air brake pipe or line of the vehicle, for supplying air under pressure into the housing for depressing the shoe 16. The piston 18 has a rod 24 upstanding therefrom and slidable through the partition 20, and there is a passage 25 extending from the upper end of the rod 24 longitudinally through said rod, piston 18 and stem 17. Said passage extends into the shoe 16 and is directed back through the stem and piston into the rod 24 to open into the chamber between the piston 18 and partition 20. One end of said passage communicates with said chamber above the piston, and the other end of the passage communicates with the chamber above the partition under the housing 22. An upwardly directed tube 27 is secured to the upper end of the rod 24 in communication with the passage 25 through which the air flows. The air in passing through the passage 25 into the space between the piston 18 and partition 20 will force said piston down, thereby depressing the shoe 16. The shoe can ride upwardly on the inclined end portions of the ramps, which will raise the piston 18 and force the air back from the space between the piston 18 and partition 20, and the air pressure in said space will hold the shoe down on the ramp with a good contact. Furthermore, inasmuch as the passage 25 extends into the shoe 16, should the shoe be broken off by accidental contact with an obstruction, the air can escape from the pipe 23 through the passage 25 to the atmosphere, and this will bleed the train line or pipe for automatically applying the air brakes.

In order that the sudden upward movement of the shoe 16 and piston 18, when the vehicle passes the ramp at a high rate of speed, is not restricted by the limited flow of air reversely through the passage 25, the partition 20 is provided with a port 28 over which a spring-seated valve 29 is disposed, said valve normally closing said port and only opening when the pressure of air between the piston 18 and partition 20 is excessive, in which event the valve 29 is forced open for the more rapid passage of air from the space between the piston 18 and partition 20. However, the valve being seated by a spring, or the like, will compel part of the air, at least, to flow back through the passage 25 and out through the tube 27. This discharge of the air through the tube 27 is used for resetting a controlling device, as will presently appear.

In order to maintain a predetermined controlling condition throughout a block between controlling stations, such as for providing caution control or retarded speed, a switch 30 is mounted for swinging movement under the hood 22 to engage a contact 31, and an electromagnet 32 is provided for closing said switch when the magnet is energized, thereby providing clear conditions in connection with the other electrical devices. When the magnet is deenergized and the switch 30 released caution or similar conditions are established through suitable mechanism (not shown), and the releasing of said switch indicates caution condition or control. A vane or wing 33, preferably of inverted cup shape, is connected to the switch 30 and moves downwardly toward the tube 27 when the switch 30 is opened, so that when the shoe 16 rides on the ramp to raise the piston 18, the air which is forced back through the passage 25 discharges from the tube 27 in a stream or gust directed toward the vane 33 to raise said vane and close the switch 30, in order that if the magnet 32 is energized, said switch will stick against the contact 31. Otherwise, if caution control is to be maintained and the magnet 32 is dead, the switch will again open, and there being no mechanical connection between the tube 27 and vane 33, said vane can drop down toward the tube even when the shoe is in raised position. Thus, the raising of the shoe when passing on a ramp produces a gust of air from the tube 27 for raising the vane 33 and closing the switch 30, so that said switch is either held closed by the magnet 32 when energized or will again open if the magnet is dead.

An electrical responsive device 34, illustrated as a solenoid, is disposed in the vehicle controlling circuit, and said circuit includes the conductor 35 connecting the solenoid 34 and the generator 36 or other source of electrical current, a conductor 37 connecting the generator and a leaf spring switch 38 bearing on a contact 39 under the housing 22, conductor 40 connecting said contact and an electromagnet 41, and a conductor 42 connecting said magnet 41 and solenoid 34. This circuit is normally closed between controlling stations, by the spring switch 38 bearing on the contact 39, for keeping the solenoid 34 energized.

When passing a controlling station with the shoe 16 moving on the ramp, the switch 38 is opened thereby placing the control of the vehicle circuit on the track apparatus. Thus, a finger 60 is carried by the upper end of the rod 24 to contact with and raise the switch 38 when the shoe 16 rides onto the ramp, for opening the switch 38 away from the contact 39. Said switch, by contact with the finger 60, is now electrically connected with the shoe 16, and the conductors 40 and 42 and magnet 41 become dead, and a conductor 61 connects the solenoid 34 with the truck 21, whereby the circuit of the solenoid 34 must now be closed between the shoe 16 and truck 21 to keep the solenoid energized, when the shoe is riding on the ramp. If the switches 14 are closed all parts of the ramp are connected to the rail 8, and the circuit will remain closed, but if the switches 14 are open, the circuit is interrupted one or more times depending upon the number of bridging switches which are open. Thus, with the shoe 16 on the ramp and the finger 60 raising the switch 38 off of the contact 39, the circuit of the solenoid 34 includes the conductor 35, generator 36, conductor 37, switch 38, finger 60, shoe 16, ramp 7, bridging means between the ramp and rail 8, the rail 8, truck 21 and conductor 61. Thus, if the shoe 16 is on the ramp section 9 with the corresponding switch open, said circuit is opened, to deenergize the solenoid 34, and when the shoe 16 is on the ramp section 10 the circuit is closed in any event by the permanent bridge 13, whereas when the shoe is on the ramp section 11 with the corresponding switch 14 open, the circuit is again opened. In this way, the circuit can be broken or opened one or more times for producing different controlling conditions in succession or progressively.

Whenever the shoe rides onto a ramp, the switch 38 being raised will open the circuit of the magent 41, and this can be used for producing a danger condition whenever passing a controlling station. Thus, the magnet 41 supports a stick armature 43, which is released when the magnet becomes dead, to thereby indicate or produce a danger condition, and said armature cannot return to the magnet without assistance, even though the magnet is reenergized, thereby maintaining danger conditions until said armature or member 43 is moved back to the magnet 41.

As a means for restoring the armature 43 if the circuit of the solenoid 34 is properly controlled, when passing the ramp, the core 44 of the solenoid is connected to a lever 45 carrying a pawl 46 for advancing a ratchet wheel 47 step by step. A pick-up rod 48 is connected to a pin 49 carried by the wheel 47 and has a hook 49' under the armature 43 on which the armature drops when released, and when the ratchet wheel 47 is turned, the rod 48 lifts the armature 43 back into attractive relation with the magnet 41. In this way, the danger condition produced by the release of the armature 43 when the shoe 16 moves on the ramp, can be avoided by the movement of the ratchet wheel 47 to raise the armature 43. The arrangement is preferably such that one step of the wheel 47 will move the armature 43 sufficiently close to the magnet 41 for the attraction of the armature to the magnet, although the rod 48 can move further if the ratchet wheel is advanced another step.

The first step of the ratchet wheel 47 is used, in the arrangement shown, for obtaining a caution controlling condition, by the deenergization of the magnet 32. Thus, a conductor 50 connects the generator conductor 37 and one terminal of the magnet 32, and the other terminal of the magnet is connected to the switch 30. The contact 31 is connected by a conductor 51 with a contact 52 bearing against the wheel 47, and said wheel is connected by a conductor 53 with the generator conductor 35, to complete the circuit of the magnet 32, which includes the generator 36, conductor 37, conductor 50, magnet 32, switch 30, contact 31, conductor 51, contact 52, wheel 47, and conductors 53 and 35. The wheel 47 has an insulating segment 54 which moves against the contact 52 when the wheel 47 is advanced one step, thus breaking the circuit of the magnet 32 and releasing the switch 30, and the switch 30 moving away from the contact 31 prevents said circuit from being closed even though the wheel 47 is returned. This will maintain caution controlling conditions unless the magnet 32 is otherwise energized or the switch 30 restored with the contact 52 electrically connected with the wheel 47. If running under caution control with the wheel 47 restored to normal position (which can be accomplished by any suitable mechanism not shown), the movement of the shoe 16 onto the ramp when leaving the block and entering the next block, will result in the stream of air discharging from the tube 27 against the vane 33 closing the switch 30, and when said switch engages the contact 31, the circuit of the magnet 32 is again closed and the switch is held closed. If, however, when the shoe moves on the ramp, the ratchet wheel 47 is advanced one step so that the insulation 54 breaks the circuit between the contact 52 and wheel 47, even though the switch 30 is closed by the gust of air against the vane 33, said switch will not remain closed but will immediately swing open again to maintain the caution control in the next block which is being entered.

In order to obtain clear conditions when the ratchet wheel 47 is advanced a second step, by the successive breaking or opening of the circuit of the solenoid 34, when passing a ramp, a switch 55 is controlled by the wheel 47 and is connected to the conductor 53. A contact 56 is engaged by said switch when the switch is moved by the second step of the wheel, and the contact 56 is connected by a conductor 57 with the terminal of the magnet 32 between said magnet and switch 30. The switch 55 has an arm 58 to be engaged by the pin 49 of the wheel 47 when the wheel is advanced the second step, whereby to swing said arm and close the switch 55 against the contact 56. In this case, the switch 55 and conductor 57 will shunt the wheel 47, contact 52, conductor 51 and switch 30, and the circuit of the magnet 32 is closed by way of such shunt in order to reenergize said magnet and attract the switch 30 to close said switch and hold it closed until the wheel 47 is restored in passing the ramp. Such circuit includes the generator 36, conductor 37, conductor 50, magnet 32, conductor 57, contact 56, switch 55 and conductors 53 and 35.

The magnet 32 is energized until the switch 55 is opened, and said switch is opened when the wheel 47 is restored, by means of a pin 59 carried by the wheel and striking the arm 58 when the wheel 47 is returned to normal position. The switch 55 is therefore opened, but the contact 52 now engaging the wheel 47 will close the circuit of the magnet 32 by way of the wheel 47, contact 52, conductor 51 and switch 30. Clear conditions are thus restored, but only when the apparatus has properly functioned after the danger condition having been produced the moment the shoe moves on the ramp.

The present apparatus obtains three conditions of control, namely, clear, caution and danger. These are obtained by the simple control of the switches 14. When both switches are closed, either by a danger signal from the way-side apparatus or by the failure of such way-side equipment, a danger signal or condition is given in the vehicle equipment. When one switch 14 is open and the other closed, a caution signal or condition is produced in the vehicle equipment, and when both switches 14 are open this will obtain a clear signal or indication in the vehicle equipment.

*Danger conditions.*

With both switches 14 closed, either intentionally or by the failure of the track equipment, danger conditions exist. Thus, when the shoe 16 rides on the ramp, with the switch 38 opened, to deenergize the magnet 41, the shoe 16 and truck 21 are electrically connected by the ramp and bridging means between the ramp 7 and rail 8, thereby keeping the solenoid 34 energized, and the ratchet device remains inactive, so that the armature 43 will remain down and thereby indicate or produce danger conditions. Should the circuit of the magnet 34 be dead, by the accidental breaking or short circuiting of the circuit, the lever 45 and pawl 46 remaining down would indicate danger conditions or could be used for producing such conditions, either when moving between controlling stations or when passing a ramp.

*Caution conditions.*

When caution control of the vehicle is wanted, one of the switches 14 is closed and the other opened. For example, supposing the switch 14 of the ramp section 9 is open and the switch 14 of the ramp section 11 is closed, then when the shoe 16 moves on the ramp section 9, toward the right as illustrated, the switch 38 is moved off of the contact 39, thereby placing the control of the circuit of the solenoid 34 on the ramp device, but the corresponding switch 14 being opened, will break the circuit between the ramp section 9 and rail 8. The solenoid 34 is therefore deenergized, and the lever 45 and pawl 46 will drop. Then, when the shoe 16 moves on the ramp section 10, the circuit is closed by the permanent bridge 13, thereby reenergizing the solenoid 34 and lifting the lever 45 so that the pawl 46 turns the ratchet wheel 47 one step. The shoe 16 in moving on the ramp section 11 keeps the circuit of the solenoid 34 closed by the closed switch 14 of the ramp section 11. Only one break of the circuit is thus obtained, and the wheel 47 moving one step, will raise the armature 43 so as to be retracted to the magnet 41 after the shoe 16 has left the ramp and the switch 38 is reclosed. The insulating segment 54 of the wheel in moving against the contact 52, will break the circuit of the magnet 32, and the switch 30 is released, which will indicate or produce caution conditions, and such conditions will be maintained through the block between the controlling stations even though the wheel 47 is restored. In leaving the block under caution control, the shoe 16 riding on the corresponding ramp, will cause the gust or puff of air from the tube 27 to raise the vane or cup 33 for closing the switch 30, and it will be held against the contact 31 by the magnet 32 on account of the reclosing of the circuit through the switch 30 and contact 52. The caution control is thus terminated at the end of the block, preparatory for the succeeding controlling condition.

*Clear conditions.*

In clear conditions, both switches 14 must be held open by the energized magnets 15, for obtaining two breaks of the circuit of the solenoid 34. Thus, as in caution conditions, the shoe 16 moving on the ramp section 8, will break the circuit between the ramp and rail, and the shoe 16 moving on the ramp section 10 will reclose the circuit of the solenoid 34, for advancing the wheel 47 one step, as described under the caution controlling conditions. When the shoe 16 moves on the ramp section 11, the corresponding switch 14 also being open, will break the circuit the second time, and the pawl 46 will drop again. Then, when the shoe leaves the ramp and the switch 38 is reclosed, the solenoid 34 is energized again, and the pawl 46 is raised for turning the wheel 47 the second step. In the meantime, the armature 43 was raised by the pick-up rod 48 so that the magnet 41 being reenergized will support said armature 43, and the wheel 47 being moved the second step, will cause the pin 49 to strike and swing the arm 58 to close the switch 55. The magnet 32 is therefore energized through the shunt controlled by the switch 55, and the switch 30 is attracted and held against the contact 31 until the wheel 47 is restored, in which event the pin 59 striking the arm 58 will again open the switch 55, but the contact 52 being in electrical connection with the wheel 47 will keep the magnet 32 energized. The vehicle can thus proceed under clear conditions without interference.

Having thus described the invention, what is claimed as new is:—

1. Vehicle controlling apparatus including a ramp having sections insulated from one another, and bridging means for electrically connecting said ramp sections and a rail of the track for the flow of current through the ramp and rail, part of the bridging means being adapted to be opened and closed.

2. Vehicle controlling apparatus including a ramp having sections insulated from one another, and bridging means for electrically connecting the ramp sections and a rail of the track for the flow of current through the ramp and rail, at least one of said bridging means including a controllable switch for opening and closing the bridge between the corresponding ramp section and rail.

3. Vehicle controlling apparatus including a ramp having end and intermediate sections insulated from one another, the intermediate section being connected electrically with a rail of the track, and means for electrically connecting the end ramp sections with and disconnecting them from said rail.

4. Vehicle controlling apparatus including a ramp having end and intermediate sections insulated from one another, the intermediate section being electrically connected with a rail of the track, switches for connecting the end ramp sections with said rail, and means controlling said switches.

5. Vehicle controlling apparatus including a ramp, a contact shoe to ride over the ramp, a vehicle controlling circuit controlled by the shoe to include said shoe and a rail of the track when the shoe is on the ramp, said ramp having sections insulated from one another, a section of the ramp being in electrical connection with said rail for the flow of current through said circuit, and bridging means between another ramp section and said rail adapted to be opened and closed to break or close said circuit accordingly.

6. Vehicle controlling apparatus including a ramp, a contact shoe to ride over the ramp, a vehicle controlling circuit controlled by the shoe to include said shoe and a rail of the track when the shoe is riding on the ramp, and means arranged whereby when the shoe rides over successive portions of the ramp said circuit can be broken and closed automatically in succession.

7. Vehicle controlling apparatus including a ramp having a section electrically connected with a rail of the track and other sections insulated from said section, a contact shoe to ride over said ramp, a vehicle controlling circuit arranged to include said shoe and rail when the shoe rides on the ramp, means controlled by said circuit for progressive operation for different conditions, and switches for connecting the last named ramp sections with and disconnecting them from said rail for breaking said circuit one or more times.

8. Vehicle controlling apparatus including a ramp, a vehicle controlling circuit to be completed by said ramp and a rail of the track when passing the ramp, and means associated with said ramp for obtaining the automatic successive breaking and closing of said circuit in passing successive portions of the ramp.

9. Vehicle controlling apparatus including a ramp, a vehicle controlling circuit arranged to include said ramp and a rail of the track when passing the ramp, means controlled by said circuit for progressive operation for different conditions by the breaking of the circuit one or more times, insulated joints in said ramp, part of the ramp being electrically connected to said rail, and means for connecting the other parts of the ramp with and disconnecting them from said rail for breaking said circuit one or more times in passing the ramp.

10. Vehicle controlling apparatus including a ramp, and a vehicle controlling circuit arranged to include said ramp and a rail of the track in passing the ramp, said ramp being constructed and arranged for the breaking of said circuit one or more times in passing the ramp.

11. Vehicle controlling apparatus including a ramp, and a vehicle controlling circuit arranged to include said ramp and a rail on the track when passing the ramp, said ramp having insulated joints, and bridging means between the ramp and rail controllable for obtaining the successive breaking and closing of said circuit when passing the ramp.

12. Vehicle controlling apparatus including a contact shoe to ride over a ramp, a cylinder, a piston working in the cylinder and carrying the shoe, means for the admission of pressure fluid into said cylinder and for the discharge of the fluid from the cylinder, and a controlling means arranged to be restored by the discharge of air from said cylinder when the piston is moved by the riding of the shoe on a ramp.

13. Vehicle controlling apparatus including a member arranged to be moved when passing a controlling station, controlling means adapted to remain in released position, and means constructed and arranged for the production of a stream of air when said member is moved, for restoring said controlling means.

14. Vehicle controlling apparatus including a member arranged to be moved when passing a controlling station, controlling means adapted to remain in released position and having a vane, and means constructed and arranged for directing a stream of air against said vane for restoring said means, when said member is moved in passing a controlling station.

15. Vehicle controlling apparatus including a movable member having a contact shoe to ride on a ramp and also having a piston, a cylinder in which said piston is movable, said member having a passage for the flow of air into the cylinder to move the piston and shoe for the contact of the shoe with the ramp, the air being forced back through said passage when the shoe rides on the ramp, and controlling means adapted to remain in released position and arranged to be restored by the discharge of air from the cylinder reversely through said passage.

16. Vehicle controlling apparatus including a contact shoe to ride on a ramp, a cylinder having a partition therein, a piston working in the cylinder and carrying said shoe, a rod extending from the piston through said partition and having a passage for the flow of pressure fluid into the cylinder between the partition and piston and for the discharge of pressure fluid from the cylinder, and controlling means adapted to remain in released position and having a vane beyond said rod whereby the fluid discharge from the cylinder through said passage is directed toward said vane for restoring said controlling means.

17. Vehicle controlling apparatus including a movable member having a contact shoe to ride on a ramp and also having a piston, a cylinder in which the piston is movable, and means for supplying air from the air brake system, said member having an air passage establishing communication between said means and cylinder and said passage extending into the shoe for the discharge of the air to the atmosphere if the shoe is broken off.

In testimony whereof I hereunto affix my signature.

ALFRED L. RUTHVEN.